United States Patent
Son

(10) Patent No.: US 7,477,029 B2
(45) Date of Patent: Jan. 13, 2009

(54) APPARATUS AND METHOD FOR CONTROLLING THE NUMBER OF ROTATIONS PER UNIT TIME OF BRUSHLESS DC MOTOR

(75) Inventor: Yeon-Ho Son, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 170 days.

(21) Appl. No.: 11/640,227

(22) Filed: Dec. 18, 2006

(65) Prior Publication Data

US 2007/0152625 A1 Jul. 5, 2007

(30) Foreign Application Priority Data

Dec. 29, 2005 (KR) ............. 10-2005-0133071

(51) Int. Cl.
*H02P 6/00* (2006.01)
(52) U.S. Cl. ............ 318/400.01; 318/459; 318/500; 318/400.34
(58) Field of Classification Search ........ 318/400.01, 318/400.34, 400.38, 459, 500, 432, 434
See application file for complete search history.

(56) References Cited

U.S. PATENT DOCUMENTS

| | | | | |
|---|---|---|---|---|
| 4,673,848 | A * | 6/1987 | Hagiwara et al. | 318/266 |
| 5,530,326 | A * | 6/1996 | Galvin et al. | 318/400.11 |
| 5,635,810 | A * | 6/1997 | Goel | 318/719 |
| 5,995,710 | A * | 11/1999 | Holling et al. | 388/811 |
| 6,184,636 | B1 * | 2/2001 | Lewis et al. | 318/400.34 |
| 6,741,049 | B2 * | 5/2004 | Kawaji et al. | 318/400.01 |
| 7,391,174 | B2 * | 6/2008 | Son | 318/400.01 |

* cited by examiner

*Primary Examiner*—Rina I Duda

(57) ABSTRACT

Disclosed is an apparatus, controlling the number of rotations per minute of a brushless DC motor, the apparatus comprising: a brushless DC motor that rotates at a constant speed when a rotation current is applied, and stops rotating when a stop current is applied; a pulse applying unit that outputs input pulses according to a pulse apply frequency, which is predetermined or inputted by a user; a rotation detecting unit that detects the number of rotation pulses, and outputs a predetermined output signal per rotation of the brushless DC motor; and a current controlling unit that applies the rotation current to the brushless DC motor in correspondence with the input pulse, and the stop current to the brushless DC motor in correspondence with the output signal.

7 Claims, 5 Drawing Sheets

APPARATUS AND METHOD FOR CONTROLLING THE NUMBER OF ROTATIONS PER UNIT TIME OF BRUSHLESS DC MOTOR

CROSS-REFERENCE TO RELATED APPLICATIONS

This application claims the benefit of Korean Patent Application No. 10-2005-0133071 filed with the Korean Intellectual Property Office on Dec. 29, 2005, the disclosures of which are incorporated herein by reference in their entirety.

BACKGROUND

1. Technical Field

The present invention relates to a DC motor, more particularly, to an apparatus and a method for controlling the number of rotations per minute of a brushless DC motor.

2. Description of the Related Art

A motor refers to a device that converts electrical energy into kinetic energy, which allows rotary or linear mechanical motion. With the expansion of its fields of application due to the widespread use of electronic equipment in the electric, electronic, and mechanical industries, the importance of the motor has increased as a critical driving source. In addition, with a rapid growth of the industries have been introduced the motors as driving sources with faster speeds and larger capacities In particular, precision control motors provide accurate movements with a fast response time and a wide range of speed controls. These motors are operated based on control signals by repeating stop, start, and reverse actions, etc. The precision control motors are continually increasing in importance with the advance of technology and expansion of application fields such as advances in power electronics, advances in microcomputers, precision processing technologies, high performance permanent magnets, and advances in surface mounting technologies.

Examples of such precision control motors include stepping motors, brushless DC motors, etc., which usually use permanent magnets with high performance.

The stepping motor is a type of electric motor that is used when something has to be positioned very precisely or rotated by an exact angle. Since the stepping motor provides digitalized control by using pulses, it is suitable for micoms. The stepping motor rotates by a specified angle and stops with a high level of precision without feedback for detecting the position of the shaft of the motor. Also, the stepping motor allows open loop control, is easily controlled through digital signals, and has a maintenance torque when stopping.

However, the torque is low in the stepping motors, so that it is difficult to apply in fields requiring high torque. Also, the stepping motor is likely to vibrate and resonate at certain frequencies, is weak against loads with inertia, and is likely to be stepped out during high-speed operations. Further, since a sufficient current cannot flow through winding wires due to an inductance effect of the winding wires during operation with a common driver, the torque is reduced with increasing pulse rate to yield a lower efficiency as compared to a DC motor.

Thus, a brushless DC motor, which provides high torque, is preferred in controlling the number of rotations per minute. Not only is the brushless DC motor durable and efficient, it allows for easy use in a constant speed control and a variable speed control.

The brushless DC motor is devised without a brush, which acts as a commutator, while maintaining the properties of a DC motor, and can be classified as a sensor type or a sensorless type according to whether or not it has a sensor that detects both the position of the rotor and the rotary speed. Such a brushless DC motor is employed in mobile devices such as mobile phones to allow the folder to implement automatic opening and closing function, or the camera module to implement automatic rotation.

Meanwhile, the rotational speed of the brushless DC motor is proportional to the voltage applied thereto. For example, when a 4V voltage is applied, the rotational speed is 6000 rpm, and when a 2V voltage is applied, the rotational speed is 3000 rpm. However, in order to perform the automatic functions, the brushless DC motor should maintain a constant rotational speed regardless of voltage decrease in the battery of the mobile device. Therefore, an integrated circuit for the driver with a low drop out regulator (LDO) has been employed to supply a constant voltage to the motor.

However, since the LDO takes up a space, it is unsuitable for small sized mobile devices. Therefore, there have been needs for a method maintaining the rotational speed of the motor without the LDO.

SUMMARY

The present invention provides an apparatus and a method for controlling a brushless DC motor to perform a constant number of rotations per minute regardless of the intensity of battery voltage.

The present invention provides a brushless DC motor control apparatus and a control method which allow a user to determine an appropriate rotational speed through inputting a desired frequency, when a mobile device folder is being opened and closed automatically, or the camera module is rotating automatically.

In an embodiment of the present invention, the apparatus for controlling the number of rotations per minute of a brushless DC motor comprises: a brushless DC motor that rotates at a constant speed when a rotation current is applied, and stops rotating when a stop current is applied; a pulse applying unit that outputs input pulses according to a pulse apply frequency, which is predetermined or inputted by a user; a rotation detecting unit that detects the number of rotation pulses, and outputs a predetermined output signal per rotation of the brushless DC motor; and a current controlling unit that applies the rotation current to the brushless DC motor in correspondence with the input pulse, and the stop current to the brushless DC motor in correspondence with the output signal.

The brushless DC motor is a sensorless type, and the rotation detecting unit detects the number of counter electromotive force pulses of the brushless DC motor.

The brushless DC motor is a sensor type, and the rotation detecting unit detects the number of F/G pulses of the brushless DC motor.

The pulse applying unit outputs the input pulses at a frequency that is the same as or lower than a frequency corresponding to a minimum rotational speed of the brushless DC motor.

The apparatus for controlling the number of rotations per minute of a brushless DC motor further comprises a gearbox connected to the brushless DC motor and having a predetermined reduction ratio to control the number of output rotations of the brushless DC motor.

In another embodiment of the present invention, the method for controlling an apparatus that comprises: a brushless DC motor rotating at a constant speed when a rotation current is applied, and stopping rotating when a stop current is applied; a pulse applying unit outputting input pulses at a pulse applying frequency, which is predetermined or inputted by a user; a rotation detecting unit; and a current controlling unit, the method comprising: (a) monitoring if the input pulse is applied from the pulse applying unit, by the current controlling unit; (b) if the input pulse was applied in step (a), outputting the rotation current that allows the brushless DC motor to rotate; (c) counting the number of rotation pulses generated by rotation of the brushless DC motor, by the rotation detecting unit; (d) determining whether the brushless DC motor has performed one rotation by comparing the number of the rotation pulses to a predetermined value; and (e) if step (d) determines that the brushless DC motor has performed one rotation, initializing the number of the rotation pulses and outputting an output signal to the current controlling unit, but if not, repeating the steps (c) and (d).

The brushless DC motor is a sensorless type, and the rotation detecting unit detects the number of counter electromotive force pulses of the brushless DC motor.

The brushless DC motor is a sensor type, and the rotation detecting unit detects the number of F/G pulses of the brushless DC motor.

Additional aspects and advantages of the present general inventive concept will be set forth in part in the description which follows, and in part will be obvious from the description, or may be learned by practice of the general inventive concept.

BRIEF DESCRIPTION OF THE DRAWINGS

These and other features, aspects, and advantages of the present invention will become better understood with regard to the following description, appended claims, and accompanying drawings where:

DETAILED DESCRIPTION

The descriptions set forth below merely illustrate the principles of the present invention. Therefore, those skilled in the art could devise various methods and apparatus thereof which realize the principles of the present invention and which do not depart from the spirit and scope of the present invention, even though they may not be clearly explained or illustrated in the present specification. Also, it is to be appreciated that not only the principles, viewpoints, and embodiments of the present invention, but all detailed descriptions listing the particular embodiments are intended to include structural and functional equivalents.

Other objectives, particular advantages, and novel features of the present invention will further be clarified by the detailed descriptions and preferred embodiments set forth below with reference to the accompanying drawings. In the describing the invention, detailed explanation of the prior art will be omitted when it is deemed to unnecessarily obscure the crux of the invention. Numerals used in the descriptions (for example, a first, a second, etc.) are merely used to distinguish equal or similar items in an ordinal manner.

Hereinafter, embodiments of the invention will be described in detail with reference to the accompanying drawings.

A sensorless type brushless DC motor and a sensor type brushless DC motor that are used in the present invention will first be described with reference to FIGS. 1 and 2.

Figure 1:
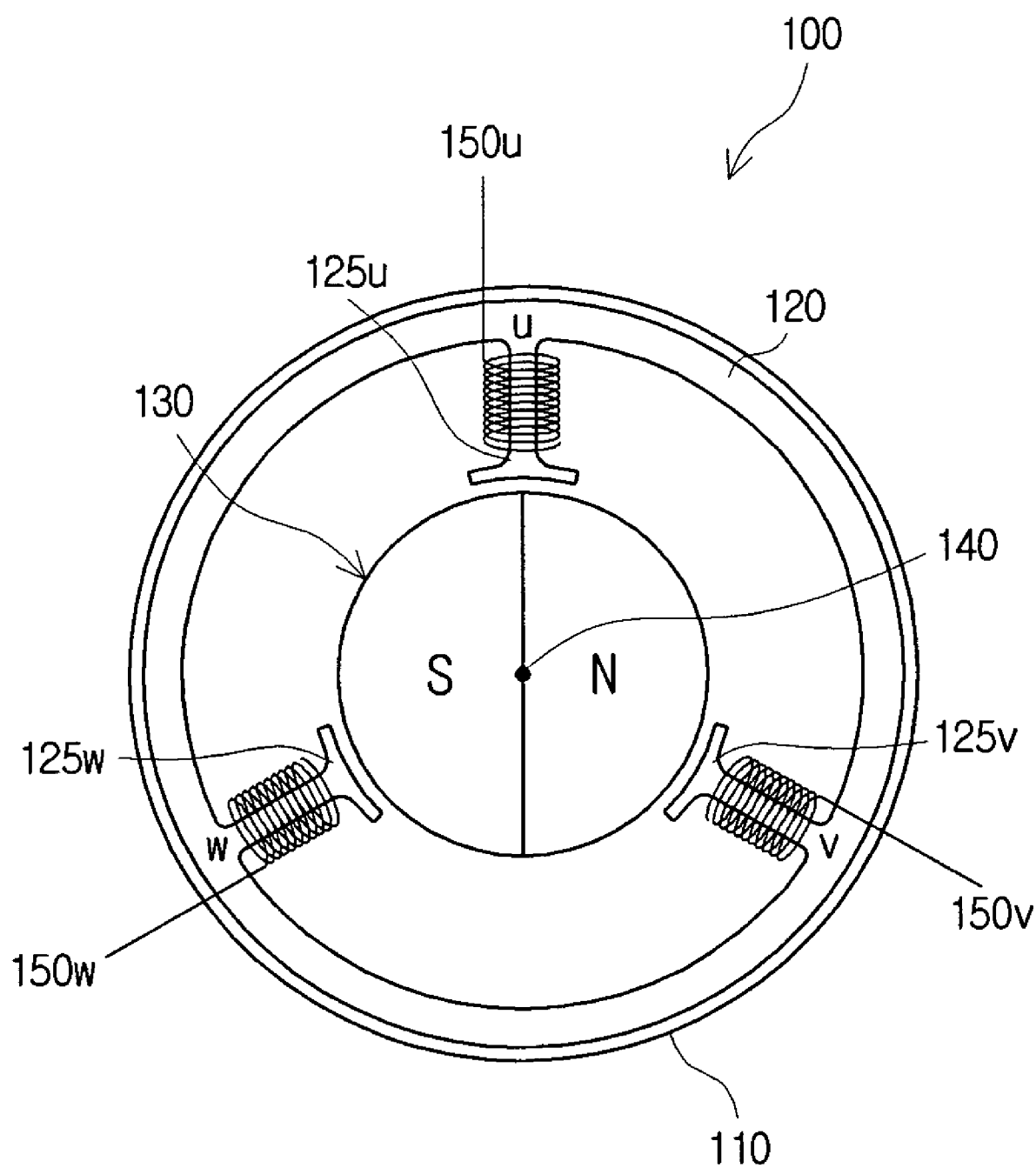
FIG. 1 is a horizontal cross sectional view of a sensorless type brushless DC motor according to an embodiment of the present invention.

FIG. 1 is a horizontal cross sectional view of a sensorless type brushless DC motor according to an embodiment of the present invention. FIG. 1 illustrates a regular inner rotor type sensorless type brushless DC motor with three phases and two poles.

The sensorless type brushless DC motor 100 includes a casing 110, a stator 120, a rotor 130, and a rotational axis 140.

The casing 110 is generally cylindrical, but of course, can be other shapes.

The stator 120 is located inside the casing 110, and includes three-phase coils (a U-phase coil 150$u$, a V-phase coil 150$v$, a W-phase coil 150$w$) wound around a plurality of (three, in the present example) T-shaped teeth (125$u$, 125$v$, 125$w$, hereinafter referred to as 125). The plurality of teeth 125 are extended toward the rotational axis 140, and an equal number of slot openings are positioned in each tooth 125 through which the three-phase coils are wound.

The rotor 130 is located inside the casing 110, is rotatably inserted and secured in the center of the stator 120 and among the teeth 125 of the stator 120, and includes a permanent magnet in which different poles (an N pole and an S pole, in the present example) are alternately positioned with respect to the rotational axis 140.

When a three-phase supply current is applied to the three-phase coils, i.e. the U-phase coil 150$u$, V-phase coil 150$v$, and W-phase coil 150$w$, the rotor 130 composed of the permanent magnet rotates about the rotational axis 140 due to torque generated according to Fleming's Left Hand Rule.

The tooth 125$u$ around which the U-phase coil 150$u$ is wound faces the N pole and the S pole once each during one rotation of the rotor 130, so that two counter electromotive force pulses are generated in the U-phase coil 150$u$. This is also true for the V-phase coil 150$v$ and the W-phase coil 15$w$.

Therefore, during one rotation of the rotor 130, 6 counter electromotive force pulses are generated in total in the U-phase coil 150$u$, V-phase coil 150$v$, and W-phase coil 150$w$. In other words, the number of rotations of the rotor 130 of the sensorless brushless DC motor 100 may be determined by dividing the sum of the number of the counter electromotive force pulses in the U-phase coil 150$u$, V-phase coil 150$v$, and W-phase coil 150$w$ by 6.

Since the stator 120 uses a three-phase induced current, the plurality of teeth 125 are formed in multiples of 3, and since the rotor 130 uses a permanent magnet with alternating N and S poles, the poles are formed in multiples of 2. Consequently, the ratio of the number of teeth 125 of the stator 120 to the number of poles of the rotor 130 is 3$a$:2$b$ (where a and b are natural numbers). During one rotation of the rotor 130, the counter electromotive force pulses are generated 2$b$ times in each tooth 125 of the stator 120, and the number of the teeth 125 of the stator 120 is a 3$a$, so that the total number of the counter electromotive force pulses in the sensorless type brushless DC motor 100 during one rotation of the rotor 130 is 6$ab$.

Figure 2:
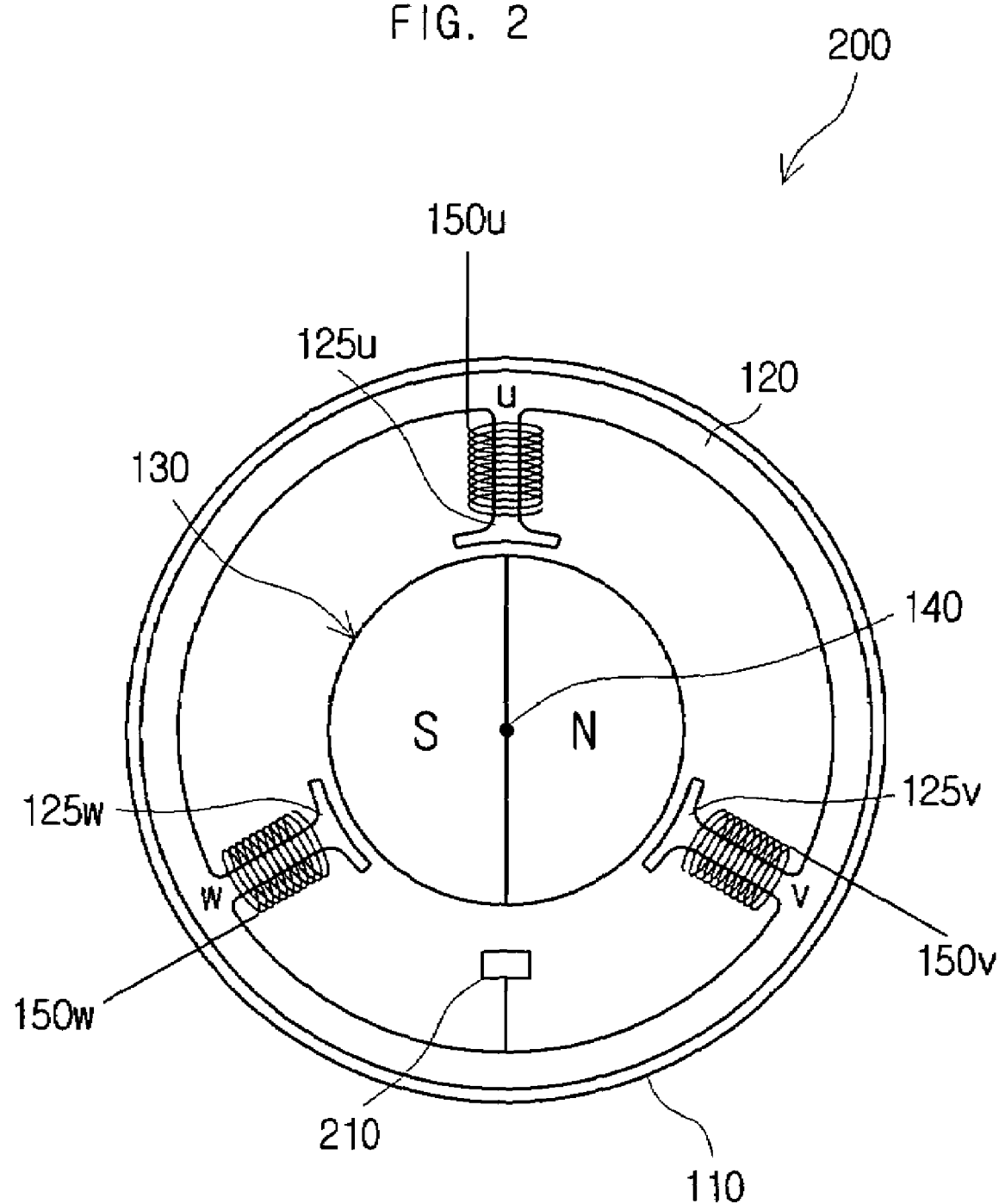
FIG. 2 is a horizontal cross sectional view of a sensor type brushless DC motor according to another embodiment of the present invention.

FIG. 2 shows a horizontal cross sectional view of a sensor type brushless DC motor according to another embodiment of the present invention. FIG. 2 illustrates a regular inner rotor type sensor type brushless DC motor with three phases and two poles.

The sensor type brushless DC motor 200 includes a casing 110, a stator 120, a rotor 130, a rotational axis 140, and a magnetic sensor 210.

The casing 110 is generally cylindrical, but of course, can be other shapes.

The stator 120 is located inside the casing 110, and includes three-phase coils (a U-phase coil 150*u*, a V-phase coil 150*v*, a W-phase coil 150*w*) wound around a plurality of (three, in the present example) T-shaped teeth 125. The plurality of teeth 125 are extended toward the rotational axis, and an equal number of slot openings are positioned in each tooth 125 through which the three-phase coils are wound.

The rotor 130 is disposed inside the casing 110, is rotatably inserted and secured in the center of the stator 120 and among the teeth 125 of the stator 120, and comprises a permanent magnet in which different poles (an N pole and an S pole, in the present example) are alternately positioned with respect to the rotational axis 140.

When a three-phase supply current is applied to the three-phase coils, i.e. the U-phase coil 150*u*, V-phase coil 150*v*, and W-phase coil 150*w*, the rotor 130 composed of the permanent magnet rotates about the rotational axis 140 due to a torque generated according to Fleming's Left Hand Rule.

The magnetic sensor 210 located inside the casing 110 detects the position of the rotor 130. It may be disposed in a space between the two teeth 125, as shown in FIG. 2, or may be disposed on the tooth 125. From its location, the magnetic sensor 210 senses the proximity of the N and S poles according to a rotation of the rotor 130, and generates a F/G pulse (Frequency Generator pulse). In the present embodiment, the magnetic sensor 210 faces the N and S poles once each to generate one F/G pulse. Accordingly, the detection of one F/G pulse indicates one rotation of the rotor 130 of the sensor type brushless DC motor 200. Here, the magnetic sensor 210 may be a hall sensor.

As the stator 120 uses a three-phase induced current, the plurality of teeth 125 are formed in multiples of 3, and as the rotor 130 uses the permanent magnet with alternating N and S poles, the poles are formed in multiples of 2. In other words, the ratio of the number of teeth 125 of the stator 120 to the number of poles of the rotor 130 is $3a:2b$ (where a and b are natural numbers). Thus, the number of F/G pulses generated by the magnetic sensor 210 during one rotation of the rotor 130 is b.

Figure 3:
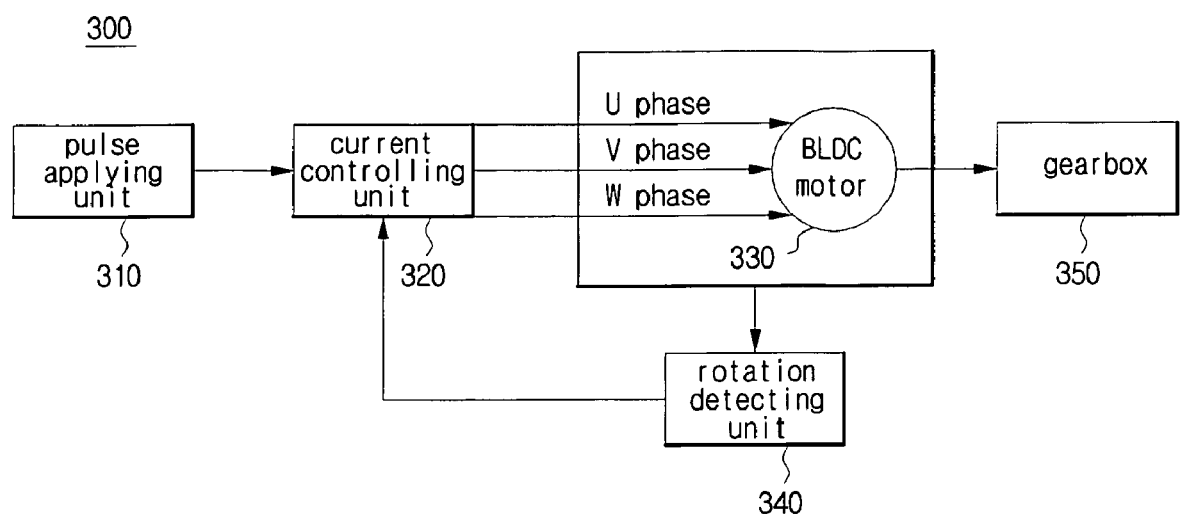
FIG. 3 is a block diagram illustrating the configuration of an apparatus controlling the number of rotations per minute of a brushless DC motor.
Figure 4:
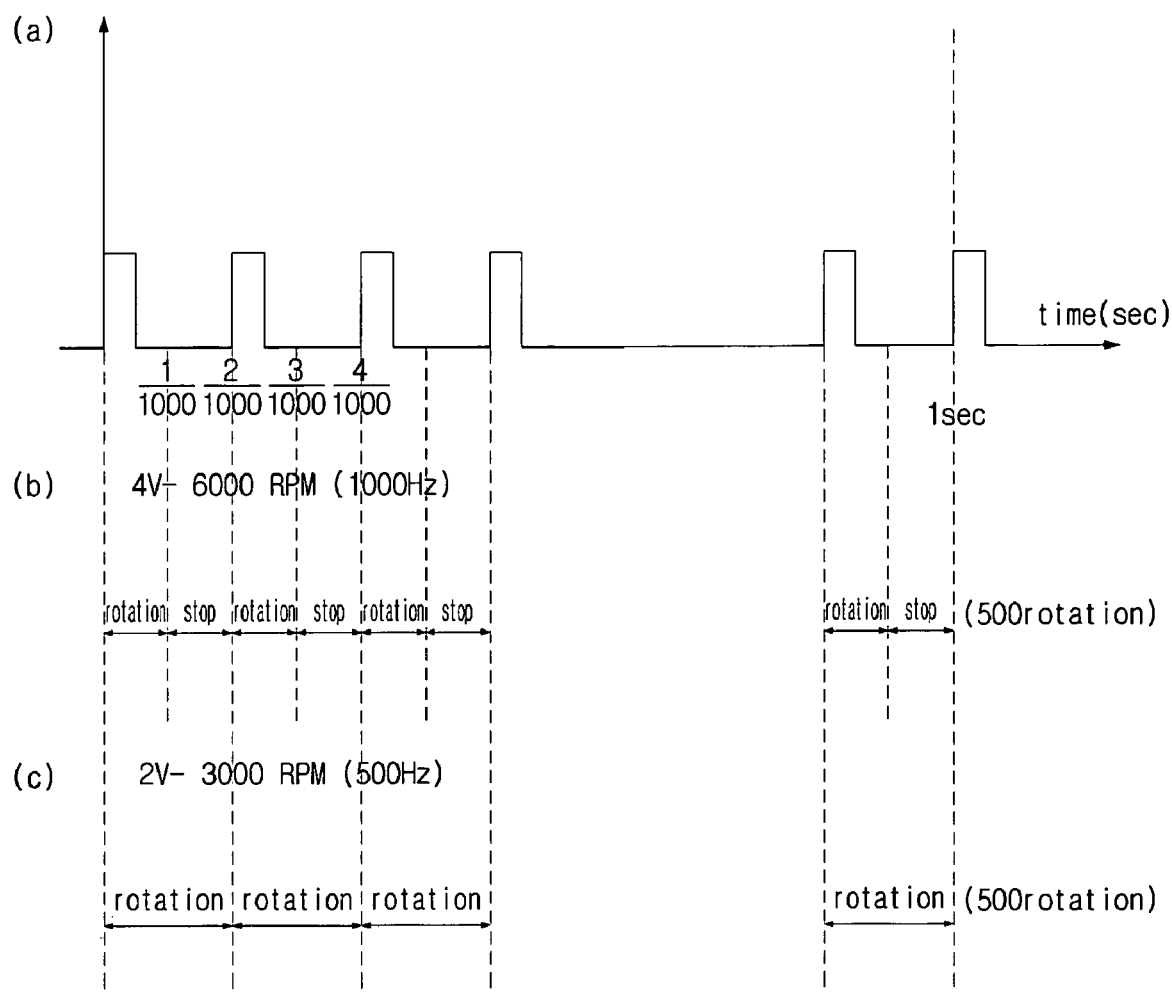
FIG. 4 is an explanatory view showing a control method according to an embodiment of the present invention.

FIG. 3 is a block diagram illustrating the configuration of an apparatus controlling the number of rotations per minute of a brushless DC motor, and FIG. 4 is an explanatory view showing a control method according to an embodiment of the present invention.

As shown in FIG. 3, the control apparatus for a brushless DC motor 300 includes a pulse applying unit 310, a current controlling unit 320, a brushless DC motor 330, and a rotation detecting unit 340. The control apparatus for a brushless DC motor 300 may further include a gearbox 350.

The brushless DC motor 330 is controlled to rotate as many times as the number of input pulses, which are applied by the pulse applying unit 310. For example, in order to rotate the brushless DC motor 330 ten times, the pulse applying unit 310 generates and applies 10 input pulses.

As described earlier, in the case that the brushless DC motor 330 is a sensorless type, 6 counter electromotive force pulses are detected during one rotation. Accordingly, 60 counter electromotive force pulses tell us that the brushless DC motor has rotated 10 times. Here, the rotation detecting unit 340 counts the number of counter electromotive force pulses generated in the brushless DC motor 330, and allows the brushless DC motor 330 to stop rotating when the counted number of the counter electromotive force pulses amounts to 60, thereby controlling the number of rotations of brushless DC motor 330.

As also described earlier, in the case that the brushless DC motor 330 is a sensor type, one F/G pulse is detected during one rotation. Accordingly, 10 F/G pulses tell us that the brushless DC motor 330 has performed 10 rotations. The rotation detecting unit 340 counts the number of the F/G pulses generated in the brushless DC motor 330, and allows the brushless DC motor 330 to stop rotating when the counted number of the F/G pulses amounts to 10, thereby controlling the number of rotations of brushless DC motor 330.

The pulse applying unit 310 applies one pulse to the current controlling unit at a frequency, which is predetermined or set by a user. The current controlling unit 320 allows the brushless DC motor 330 to rotate only when the input pulse is applied by the pulse applying unit 310. In short, when the input pulse is applied according to a particular frequency to the current controlling unit 320, the current controlling part 320 rotates the brushless DC motor 330 according to the frequency at which the input pulse is applied.

In case that the pulse applying unit 310 applies the input pulses to the current controlling unit 320 at a frequency lower than the rotational speed of the brushless DC motor 330, the brushless DC motor 330 performs one rotation per input pulse, and then remains stopped until a next input pulse is applied. By repeating these rotations and stops alternately, the brushless DC motor 330 appears to have the same rotational speed as the frequency, at which the input pulses are applied by the pulse applying unit 310.

FIG. 4(*a*) illustrates that the pulse applying unit 310 applies pulses at a 500 Hz frequency. It means that one pulse is applied per 0.002 sec to the current controlling unit 320.

FIG. 4(*b*) illustrates that a 4V input voltage is applied to the brushless DC motor 330, and the rotational speed of the brushless DC motor is 6000 rpm, namely, 100 Hz in terms of frequency. Then, the brushless DC motor 330 performs one rotation for 0.01 sec in accordance with the applied input pulse, and stops for the subsequent 0.01 sec until the next input pulse is applied. The brushless DC motor 330 performs 3000 (500×60) rotations for one minute by repeating rotations and stops, whereby the brushless DC motor 330 appears to rotate at 3000 rpm.

FIG. 4(*c*) illustrates a case where the input voltage applied to the brushless DC motor 330 has dropped to 2V due to battery consumption, and the rotational speed of the brushless DC motor 330 has decreased to 3000 rpm, namely, 50 Hz in terms of frequency, in correspondence thereto. In this case also, the pulse applying unit 310 applies one pulse per 0.02 sec to the current controlling unit 320. Meanwhile, the rotational speed of the brushless DC motor 330 is 3000 rpm, so that the brushless DC motor 330 performs one rotation per 0.02 sec without stopping. Consequently, 3000 (60×50) rotations are performed for one minute, so that the rotational speed of the brushless DC motor 330 remains at 3000 rpm.

Therefore, in both cases where the input voltage is 4V and thereby the rotational speed is 6000 rpm, and where the input voltage is 2V and thereby the rotational speed is 3000 rpm, the number of rotations per minute is the same.

However, it is desirable that the pulse applying frequency of the pulse applying unit 310 be lower than a minimum rotational speed of the brushless DC motor 330 corresponding to a weakest battery voltage (e.g. approximately 3V). For example, in the case that the battery voltage is maintained between 3 and 4 V, since the minimum rotational speed is 4500 rpm, the pulse applying frequency can be decided to be 500 Hz (3000 rpm in terms of rotational speed). Therefore, the brushless DC motor 330 can perform 3000 rotations for one minute regardless of voltage drop in the battery.

In the case that the pulse applying frequency exceeds the frequency corresponding to the minimum rotational speed, when the battery voltage drops to the lowest level, the pulse applying unit 310 applies a next input pulse even before the brushless DC motor 330 finishes one rotation, whereby the brushless DC motor 330 cannot perform a desired number of rotations.

The rotation detecting unit 340 counts the number of rotation pulses generated by the rotation of the rotor of the brushless DC motor 330.

When the brushless DC motor 330 is a sensorless type, the rotation pulses refer to the counter electromotive force pulses detected from the multi-phased coil. For example, in the brushless DC motor with three phases and two poles shown in FIG. 1, 6 counter electromotive force pulses are detected per rotation of the rotor. The rotation detecting unit 340 counts the total number of the counter electromotive force pulses. However, it is preferable that, when the brushless DC motor 330 stops, the rotation detecting unit 340 be set to an initial value (e.g. '0') to renew the counting with reactivation of the brushless DC motor 300.

Otherwise, in the case that the brushless DC motor 330 is a sensor type, the rotation pulse refers to the FIG pulse detected from the magnetic sensor. For example, in the brushless DC motor with three phases and two poles shown in FIG. 2, one F/G pulse is detected per rotation of the rotor. The rotation detecting unit 340 counts the total number of the F/G pulses. However, it is preferable that, when the brushless DC motor 330 stops, the rotation detecting unit 340 be set to an initial value (e.g. '0') to renew the counting with reactivation of the brushless DC motor 330.

The rotation detecting unit 340 applies a predetermined output signal to the current controlling unit 320 every time it detects one rotation of the brushless DC motor 330.

The current controlling unit 320 controls the current applied to the brushless DC motor 330, according to which the brushless DC motor 330 continues to rotate at a constant speed or stops. In order to stop the brushless DC motor 330, a zero current is applied or a multi-phase current with an equal intensity is applied to each stator included in the brushless DC motor 330.

When the input pulse is applied from the pulse applying unit 310, the current controlling unit 320 allows the brushless DC motor 330 to perform one rotation. Subsequently, the rotation detecting unit 340 applies the output signal to the current controlling unit 320, whereupon the brushless DC motor 330 stops.

The current controlling unit 320 may include a multi-phase inverter (not shown in the accompanying drawings). The multi-phase inverter changes a phase of each current such that a current with a different phase is applied to the U-phase, V-phase, and W-phase coils, respectively, when the current controlling unit 320 outputs a rotation current or a stop current to the brushless DC motor 330. Here, the rotation current refers to a current allowing the brushless DC motor 330 to rotate in a certain direction, and the stop current refers to a current having the same phase that is applied to the U phase, V phase, and W phase coils in order to stop the brushless DC motor 330.

The apparatus for controlling the brushless DC motor 300 may include a gearbox 350. The gearbox 350 is connected to the brushless DC motor 330 to reduce the rotational output thereof. The gearbox 350 controls the rotary angle of brushless DC motor 330 in proportion to the number of rotations thereof in accordance with a predetermined gear reduction ratio.

In the case that the gear reduction ratio of the gearbox 350 is k:1 (where k is a natural number), the brushless DC motor 330 rotates once to generate a 1/k number of rotation of the gearbox, whereby an accurate angle control can be obtained. For example, when the k is 360, the brushless DC motor 330 rotates to generate an output rotation by 1°, and when the k is 720, the brushless DC motor 330 performs one rotation to generate an output rotation by 0.5°.

Also, the pulse applying frequency of the pulse applying unit 310 can be predetermined or inputted by a user. For example, the user can input the frequency by pressing a button of a keypad or selecting from a menu bar.

It is to be appreciated that each component of the invention may be combined or separated to perform the functions as set forth above, without departing from the spirit of the invention.

Hereinafter, a method for maintaining the number of rotations per minute of the brushless DC motor regardless of the intensity of battery voltage will be described with reference to FIG. 5.

Figure 5:
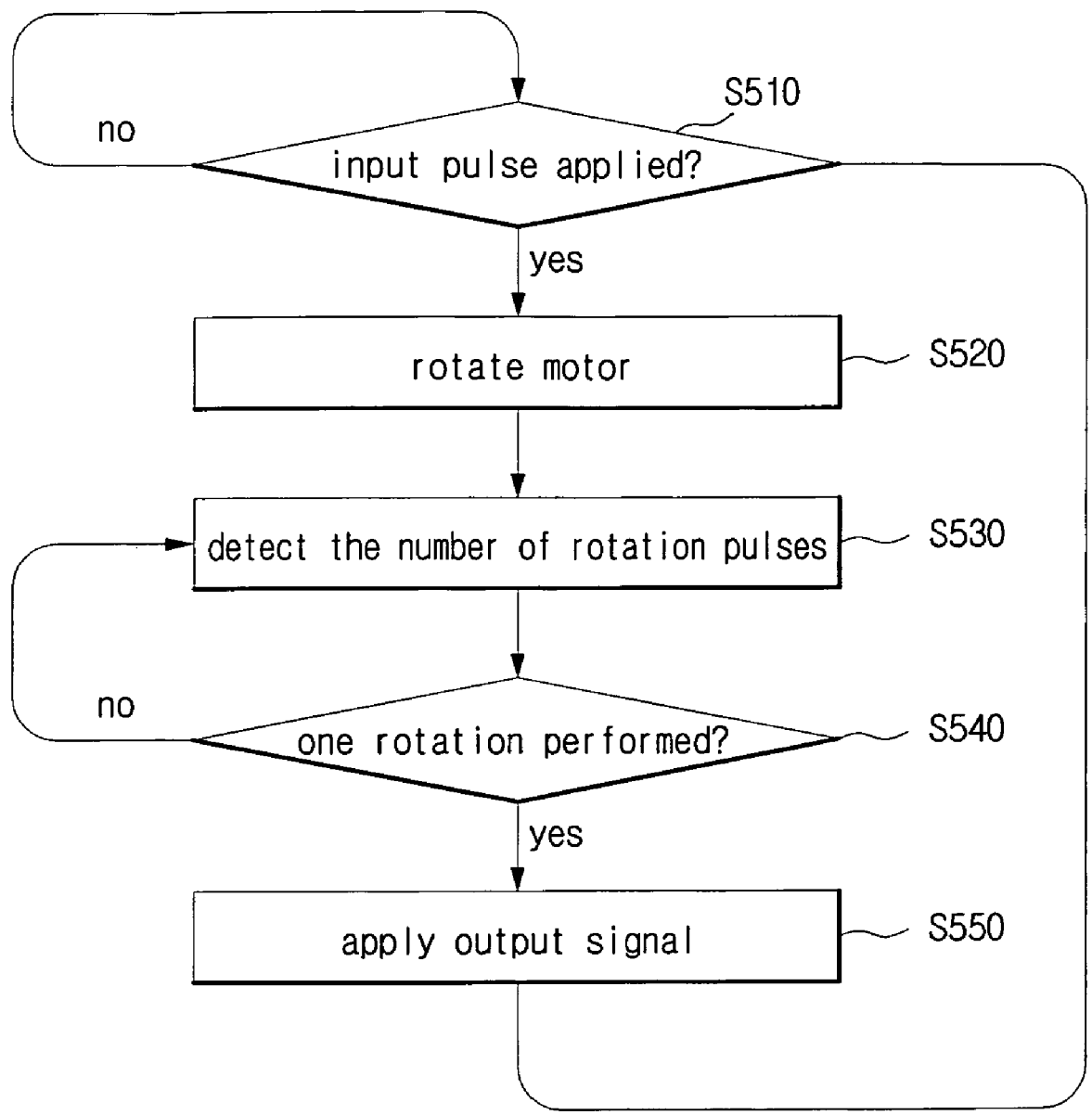
FIG. 5 is a flow chart illustrating a control method for a brushless DC motor according to an embodiment of the present invention.

FIG. 5 is a flowchart illustrating a control method for a brushless DC motor according to an embodiment of the present invention.

As shown in FIG. 5, at step S510, a current controlling unit 320 monitors if an input pulse has been applied from a pulse applying unit 310.

If the input pulse is applied, the current controlling unit 320 proceeds to step S520 to rotate the brushless DC motor 330. However, if not, the current controlling unit 320 waits until the input pulse is applied.

At step S530, the rotation detecting unit 340 detects rotation pulses generated by the rotation of the brushless DC motor 330, and counts the total number of them.

At step S540, if a predetermined number of the rotation pulses are detected, the rotation detecting unit 340 proceeds to step S550 to initialize the rotation pulse number, and generates an output signal, which is applied to the current controlling unit 320.

However, if the detected pulses do not amount to the predetermined number, the process returns to step S530 to continue to count the number of the rotation pulses generated due to the rotation of the brushless DC motor 330.

Here, when 6 counter electromotive force pulses (in the sensorless type) or one F/G pulse (in the sensor type) is detected, the rotation detecting unit 340 determines that the brushless DC motor 330 has performed one rotation, and thus applies the output signal to the current controlling unit 320.

Upon the output signal, the current controlling unit 320 applies the stop current instead of the rotation current, in order to stop the brushless DC motor 330. Then, the current controlling unit 330 does not allow the brushless DC motor 330 to rotate until a subsequent pulse is applied.

While the invention has been described with reference to the disclosed embodiments, it is to be appreciated that those skilled in the art can change or modify the embodiments without departing from the scope and spirit of the invention or its equivalents as stated below in the claims.

What is claimed is:

1. An apparatus, to control the number of rotations per minute of a brushless DC motor, comprising:

a brushless DC motor that rotates at a constant speed when a rotation current is applied, and stops rotating when a stop current is applied;

a pulse applying unit that outputs input pulses according to a pulse apply frequency, which is the same as or lower than a frequency corresponding to minimum rotations per minute of the brushless DC motor;

a rotation detecting unit that detects the number of rotation pulses, and outputs a predetermined output signal per rotation of the brushless DC motor; and a current controlling unit that applies the rotation current to the brushless DC motor in correspondence with each pulse of the input pulses, and the stop current to the brushless DC motor in correspondence with the output signal.

2. The apparatus to control the number of rotations per minute of a brushless DC motor of claim 1, wherein the brushless DC motor is, and the rotation detecting unit detects the number of counter electromotive force pulses of the brushless DC motor.

3. The apparatus to control the number of rotations per minute of a brushless DC motor of claim 1, wherein the brushless DC motor includes a sensor, and the rotation detecting unit detects the number of F/G pulses of the brushless DC motor.

4. The apparatus to control the number of rotations per minute of a brushless DC motor of claim 1, further comprising:

a gearbox connected to the brushless DC motor, the gearbox having a predetermined reduction ratio to control the number of output rotations of the brushless DC motor.

5. A method for controlling an apparatus that includes a brushless DC motor rotating at a constant speed when a rotation current is applied, and stopping rotating when a stop current is applied; a pulse applying unit to output input pulses at a pulse applying frequency; a rotation detecting unit to detect the number of rotation pulses of the brushless DC motor and to output a predetermined output signal per rotation of the brushless DC motor; and a current controlling unit to apply the rotation current or the stop current to the brushless DC motor, the method comprising:

monitoring if the input pulse is applied from the pulse applying unit, by the current controlling unit;

if the input pulse was applied from the pulse applying unit, outputting the rotation current that allows the brushless DC motor to rotate;

counting the number of rotation pulses generated by rotation of the brushless DC motor, by the rotation detecting unit;

determining whether the brushless DC motor has performed one rotation by comparing the number of the rotation pulses to a predetermined value; and resetting the number of the rotation pulses and outputting an output signal to the current controlling unit and outputting the stop current that allows the brushless DC motor to stop if it is determined that the brushless DC motor has performed one rotation; and if it is determined that the brushless DC meter has not performed one rotation, repeating determining whether the brushless DC motor has performed one rotation by comparing the number of the rotation pulses to a predetermined value until it is determined that the brushless DC motor has performed one rotation, and then resetting the number of the rotation pulses and outputting an output signal to the current controlling unit and outputting the stop current that allows the brushless DC motor to stop.

6. The method of laim 5, wherein the brushless DC motor is sensorless, and the rotation detecting unit detects the number of counter electromotive force pulstes of the brushless DC motor.

7. The method of claim 5, wherein the brushless DC motor includes a sensor, and the rotation detecting unit detectes the number of F/G pulses of the brushless DC motor.

* * * * *

UNITED STATES PATENT AND TRADEMARK OFFICE
CERTIFICATE OF CORRECTION

PATENT NO. : 7,477,029 B2
APPLICATION NO. : 11/640227
DATED : January 13, 2009
INVENTOR(S) : Yeon-Ho Son Page 1 of 1

It is certified that error appears in the above-identified patent and that said Letters Patent is hereby corrected as shown below:

Column 8, Line 66, change "apparatus," to --apparatus--.

Column 10, Line 21, change "meter" to --motor--.

Column 10, Line 31, change "laim" to --claim--.

Column 10, Line 33, change "pulstes" to --pulses--.

Column 10, Line 36, change "detectes" to --detects--.

Signed and Sealed this

Thirty-first Day of March, 2009

JOHN DOLL
*Acting Director of the United States Patent and Trademark Office*